United States Patent [19]
Marturano et al.

[11] Patent Number: 5,636,230
[45] Date of Patent: Jun. 3, 1997

[54] METHOD FOR ELIMINATING A RECEIVING DATA UNIT AS A SOURCE OF EXCESSIVE RESEND REQUESTS

[75] Inventors: Lawrence J. Marturano, Mount Prospect; Michael L. Needham, Palatine; Kenneth J. Crisler, Wheaton, all of Ill.

[73] Assignee: Motorola, Inc., Schaumburg, Ill.

[21] Appl. No.: 661,808

[22] Filed: Jun. 11, 1996

Related U.S. Application Data

[63] Continuation of Ser. No. 251,164, May 31, 1994, abandoned.

[51] Int. Cl.$^6$ .................................................. H04L 1/18
[52] U.S. Cl. ............................................................ 371/32
[58] Field of Search ............................................. 371/32

[56] References Cited

U.S. PATENT DOCUMENTS

| | | | |
|---|---|---|---|
| 4,887,162 | 12/1989 | Arai | 358/400 |
| 5,144,644 | 9/1992 | Borth | 375/341 |
| 5,181,209 | 1/1993 | Hagenauer et al. | 371/43 |
| 5,351,274 | 9/1994 | Chennakeshu et al. | 375/347 |
| 5,363,413 | 11/1994 | Vos | 375/340 |

OTHER PUBLICATIONS

S.B. Calo and M.C. Easton, "A Broadcast Protocol for File Transfer to Multiple Sites", IEEE Trans. on Communications, pp. 1701–1707, Nov., 1981.

K. Mase et al., "Go–Back–N ARQ Schemes for Point–To–Multipoint Satellite Communications", IEEE Trans. on Communications, pp. 583–589, Apr., 1983.

D. Towsley and S. Mithal, "A Selective Repeat ARQ Protocol For A Point To Multlipoint Channel", Proc. 6th Annual Conf. IEEE Computer and Communication Soc., pp. 521–526, 1987.

Y. Yamauchi, "On The Data Transmission Delay Of The Multiple Mobile Packet Radio", Proc. of the IEEE Annual Vehicular Technology Conference, pp. 426–428., 1991.

*Primary Examiner*—Stephen M. Baker
*Attorney, Agent, or Firm*—Christopher P. Moreno

[57] ABSTRACT

A transmitting data unit (101) transmits a data message (110) comprising a plurality of data blocks (111–112) to at least one receiving data unit (102–103). Upon reception of the data blocks, at least one corruption metric is determined for the received data blocks. Using the at least one corruption metric, it is determined if a portion of received data blocks has been inadequately received. When the portion of received data blocks has been inadequately received, a resend counter is incremented. If the resend counter exceeds a counter limit value, transmission of resend requests is disabled. Transmission of resend requests may be re-enabled upon satisfaction of a re-enable condition or expiration of a predetermined period of time.

22 Claims, 3 Drawing Sheets

METHOD FOR ELIMINATING A RECEIVING DATA UNIT AS A SOURCE OF EXCESSIVE RESEND REQUESTS

This is a continuation of application Ser. No. 08/251,164, filed May 31, 1994 and now abandoned.

FIELD OF THE INVENTION

The present invention relates generally to communication systems and, in particular, to a method for communicating a data message.

BACKGROUND OF THE INVENTION

A large variety of communication systems exist for the purpose of communicating data between two or more points. For example, two-way radio communication systems are known to comprise a plurality of communication units (e.g., in-car mobiles or in-hand portables) and repeaters that transmit and receive information via a limited number of radio frequency (RF) communication resources (channels).

The integrity of data communicated via RF channels is typically affected by noise and/or interference, which has the effect of inducing errors in the data being communicated. To achieve reliable data transfers, some type of error-control protocol is needed. Quite often, an automatic repeat-request (ARQ) protocol is used in which error detection coding is performed in a transmitter on sets of data, known as packets or blocks, such that a receiver, experiencing poor channel quality, can detect the occurrence of errors. In the event that correctable errors or no errors are detected, the receiver responds with an acknowledgment (ACK) of correct reception. In the event that uncorrectable errors are detected, the receiver responds with a negative acknowledgment (NACK) indicating that the packet contained uncorrectable errors. Upon reception of a NACK, the transmitter may resend the block or blocks corresponding to the NACK.

The forms of ARQ most commonly used with RF data communication systems are "Stop-And-Wait" ARQ (SAW-ARQ), "Go-Back-N" ARQ (GBN-ARQ), and "Selective Repeat" ARQ (SR-ARQ). These techniques, and various derivatives based on them, are well suited for point-to-point type communications. These ARQ methods, however, function poorly in broadcast data communication systems (i.e., point-to-multipoint data transmission). In such a system, the quality of each communication channel between the transmitter and multiple receivers may vary widely. Those receivers having poor channel quality may require a large, perhaps indefinite, number of re-transmissions in order to correctly receive the data. Since a broadcast transmitter typically delays transmission of further data during the re-transmission of previous data, such receivers can add significantly to the transmission time of the entire data message, thus reducing overall efficiency of the system.

To prevent indefinite delays, it is known in broadcast data communication systems to limit, in the transmitter, the number of re-transmissions for any particular data packet. While this will prevent indeterminate delays in the transmission of a message, it is possible that a single receiver could quickly force the maximum number of re-transmissions. In this case, the transmitter may have little assurance that any data packets were correctly received by any of the receivers.

To avoid these difficulties, other non-ARQ based error control strategies may be used. Such methods, however, may not provide sufficient error protection, particularly when no errors can be tolerated in the messages. Therefore, a need exists for a method of ARQ error protection that does not suffer from the difficulties encountered when used in broadcast data communication systems.

DESCRIPTION OF A PREFERRED EMBODIMENT

Generally, the present invention provides a method for communicating information in a broadcast data communication system. Upon reception of a plurality of data blocks, at least one corruption metric is determined for the received data blocks. Using the at least one corruption metric, it is determined if a portion of received data has been inadequately received. When the portion has been inadequately received, a resend counter is incremented. If the resend counter does not exceed a counter limit value, a resend request is transmitted. If, however, the resend counter exceeds the counter limit value, transmission of subsequent resend requests is disabled. Such a method provides enhanced efficiency when communicating data messages within a broadcast data communication system.

Figure 1:
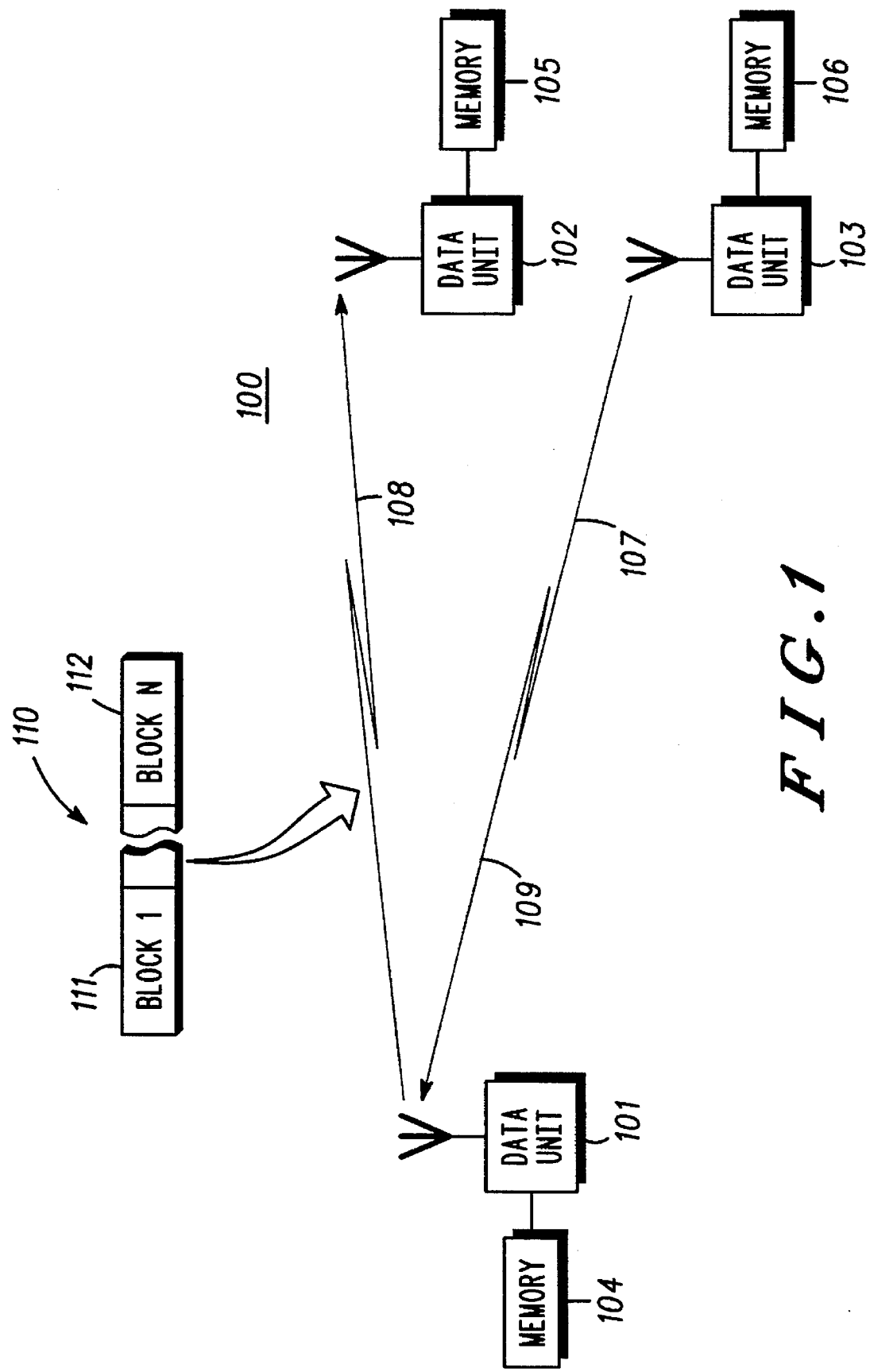
FIG. 1 illustrates a block diagram of broadcast data communication system in accordance with the present invention.

The present invention can be more fully described with reference to FIGS. 1–3. FIG. 1 illustrates a broadcast data communication system (100) that includes data units (101–103) capable of communicating with each other via a communication resource (107). Each data unit (101–103) has memory (104–106) for the storage of operational instructions and parameters as well as data variables. The communication resource (107) comprises radio frequency (RF) channels (108–109). For illustrative purposes, it is hereinafter assumed that the first data unit (101) is transmitting a data message (110), comprising N data blocks (111–112), to the receiving data units (102–103). The data units (101–103) can be mobile data terminals, such as ASTRO™, MIRS™ or 91386-type subscriber radios, and/or MIRS™ or QUANTAR™ base stations, all by Motorola, Inc. In a broadcast communications system, data messages are transmitted from one transmitting data unit to a multiplicity of receiving data units. The message may be a short alphanumeric text message, as in a fleet paging application, or a longer binary file, such as a computer executable file, in which few or no errors can be tolerated. A typical application might be wireless transmission of computer software upgrades.

For example, consider the broadcast transmission of the data message (110) from the single transmitting data unit (101) to the receiving data units (102–103). The communication resource (107) over which the data message (110) is to be transmitted is unreliable, i.e., information transmitted across it is subject to errors. In a mobile radio implementation, the aforementioned unreliability of the communication resource (107) is a result of well-understood fading and interference. To combat this unreliability, the data message (110) is partitioned into N data blocks (111–112). A error control code, as known in the art, is added to, and considered a part of, each data block (111–112), thus allowing the receiving data units (102–103) to detect errors induced during transmission, and in some cases, to correct these errors.

Using this and possibly other measures, the receiving data units (102–103) can identify blocks that were inadequately received. Any of a number of indices may be used for this purpose. For example, a block may be deemed inadequately received if the number of bit errors in a data block exceeds a predetermined threshold, e.g., 1 error. As another example, reliability may be measured in an RF environment by received signal strength. In this case, a block may be deemed inadequately received if the received signal strength indicator (RSSI) falls below the predetermined threshold, e.g., −95 dBm, over a data block. In yet another example, a signal-to-noise (S/N) measurement over a data block, when less than a threshold of 10 dB for instance, may be used to indicate inadequate reception.

Once identified by the receiving data units (102–103), inadequately received data blocks cause a resend request (i.e., a NACK) to be sent to the transmitting data unit (101). The transmitting data unit (101) can then resend the inadequately received data blocks until as many of the receiving data units (102–103) as possible have received the entire message (110). In a broadcast application, however, the use of NACKs can seriously degrade the efficiency of the message transfer because receiving data units operating in poor signal quality conditions may cause repeated resending of nearly all of the data blocks (111–112), even though the majority of the receiving data units do not experience inadequately received data blocks. The present invention improves broadcast efficiency by providing a mechanism for adaptively disabling the transmission of NACK messages by the receiving data units (102–103) based on the probability that the receiving data units (102–103) are causing excessive resends of inadequately received data blocks.

Figure 2:
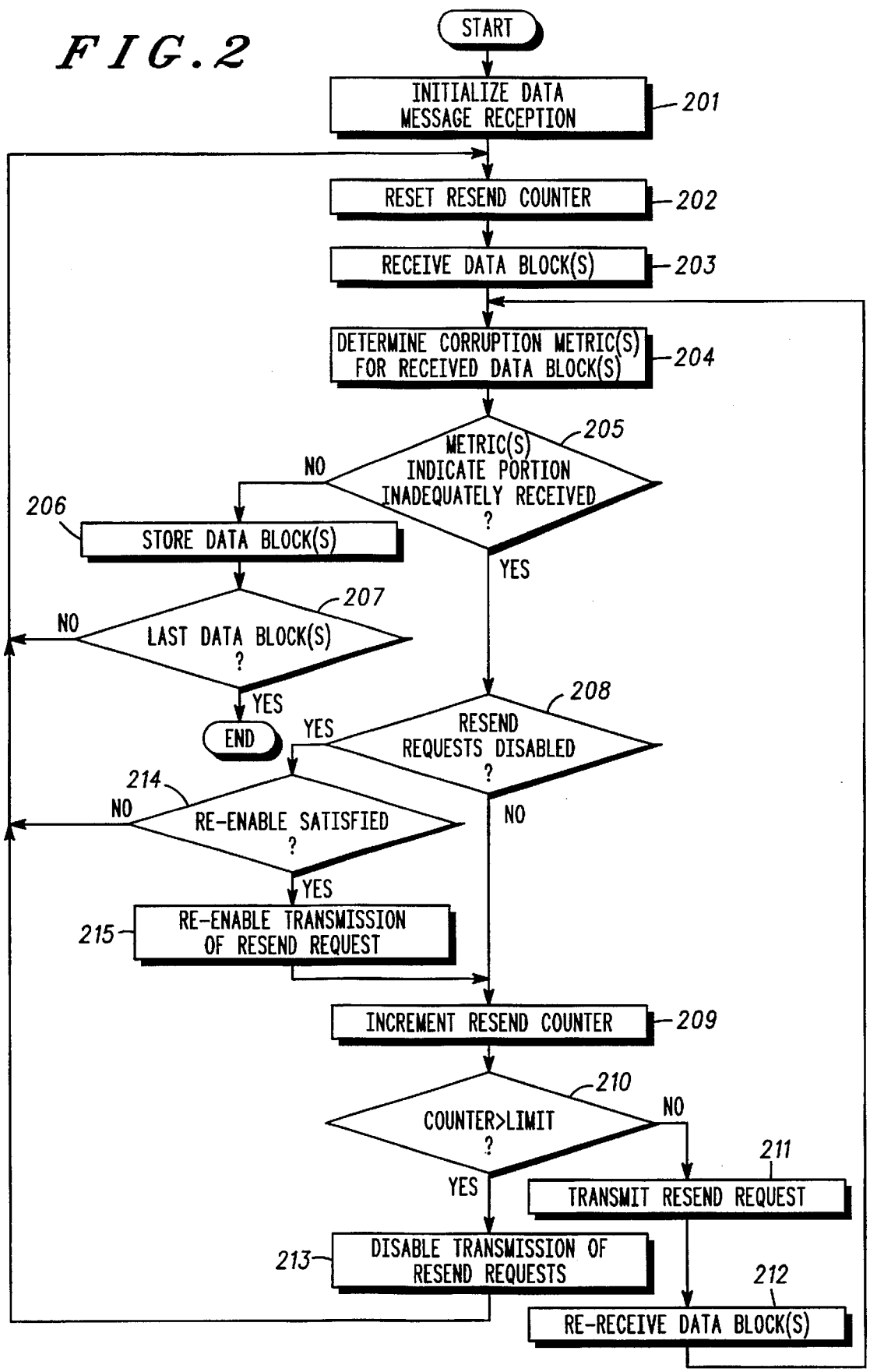
FIG. 2 illustrates a flowchart of a method of communicating a data message that can be incorporated by a receiver when receiving a data message in accordance with the present invention.

FIG. 2 illustrates a flowchart of a preferred embodiment which may be used by a receiving data unit when receiving a data message in accordance with the present invention. It is understood that the process described below may be simultaneously implemented in each of the receiving data units (102–103). At step 201, a receiving data unit is notified, via reception of a commonly-used preamble message, that a data message is about to be transmitted. Overhead information related to the transmission of the data message, such as message length, are typically included. This step may also include security handshaking with the transmitting data unit to ensure that the receiving data unit is authorized to receive the data message.

In addition to the above-described initialization, a resend counter is reset (202). This resend counter tracks the number of times a resend request is sent for re-transmission of a particular data block or group of data blocks. After initialization is complete, a particular data block is received (203). In a preferred embodiment, the processing described in FIG. 2 is restricted to the case of single received data blocks received in a serial fashion. It is nevertheless understood that the present invention is equally suited to the reception of a portion of received data blocks, typically comprising groups of individual blocks. The term "portion" is hereinafter used to refer to that part of the data message received in step 203.

After reception (203), at least one corruption metric is determined for the portion of received data blocks (204). A corruption metric is typically determined on a block-by-block basis and may be based on the indices (i.e., bit errors, RSSI, S/N measurement) described above. Alternatively, other measures of signal fidelity may be used, such as a measurement of interference, or the corruption metric may be based on one or more of the indices described above. Based on the corruption metric(s), a determination is made if the portion of received data blocks has been inadequately received (205).

When the portion has been adequately received (205), processing continues at step 206 wherein the received portion is stored in memory for later reconstruction of the entire message. If the stored portion contains the last data block of the message (207), the procedure ends. If the stored portion does not contain the last data block of the message, the resend counter is reset (202), and a new portion is received (203).

When the portion has been inadequately received (205), it is determined if the transmission of resend requests is currently disabled. If the transmission of resend requests is currently not disabled (208), the resend counter is incremented (209). As noted above, the counter tracks how many times a resend request has been sent for the current portion of received data blocks. The resend counter is compared to a counter limit value representing the maximum allowable number of resend requests for any portion of received data blocks (210). For example, the counter limit value can be set to 10. In this case, a receiving data unit that has not correctly received a given portion after 10 re-transmissions is assumed to be compromising efficiency of the broadcast data communication system due to excessive resend requests. The counter limit value may be determined based on the average message transfer speed and the average number of receiving data units that correctly receive the data message. Note that the counter limit value may be set by the transmitting data unit for each data message and sent to the receiving data units during the preamble message discussed above. Furthermore, the resend counter can just as easily be set to the counter limit value at step 202 and decremented at step 209, in which case the comparison of step 210 is with zero.

If the resend counter has not exceeded the counter limit value (210), a resend request is transmitted (211). This resend request may include identification of the portion of received data blocks in question. In a preferred embodiment, a resend request, including identification, is transmitted in response to each data block in the inadequately received portion. After re-transmission by the transmitting data unit, the portion is then re-received (212), and processing resumes at step 204 as described above.

If the resend counter has exceeded the counter limit value (210), the receiving data unit is assumed to be operating in an area of poor reception, and transmission of subsequent resend requests is disabled (213). In this manner, the receiving data unit is eliminated as a source of excessive resend requests. Note that in some cases, the transmission media reliability can change for a given receiving data unit. For example, a mobile data terminal may be in a moving vehicle that is approaching the transmitting data unit, in which case the average signal strength and, hence, the reliability of the communication channel, increases over the duration of the data message transmission. In such a case, the resend requests may be re-enabled, as described below.

If the transmission of resend requests is currently disabled (208) when a portion of received data blocks is inadequately received, a determination can be made if resend requests should be re-enabled (214). Note that re-enablement of resend requests may be determined at any time during message reception. For example, once resend requests are disabled, it may be desirable to re-enable them if N portions are received correctly in a row. Such an occurence would indicate that the data unit's environment has changed significantly, and that it can once again benefit from limited re-transmissions without adversely impacting system efficiency. Alternatively, this determination could be based on improving RSSI, improving signal-to-noise, or any combination of the above. If such a re-enable condition is satisfied (214), transmission of resend requests is re-enabled (215), the resend counter in incremented (209), and processing continues at step 210 as above.

Figure 3:
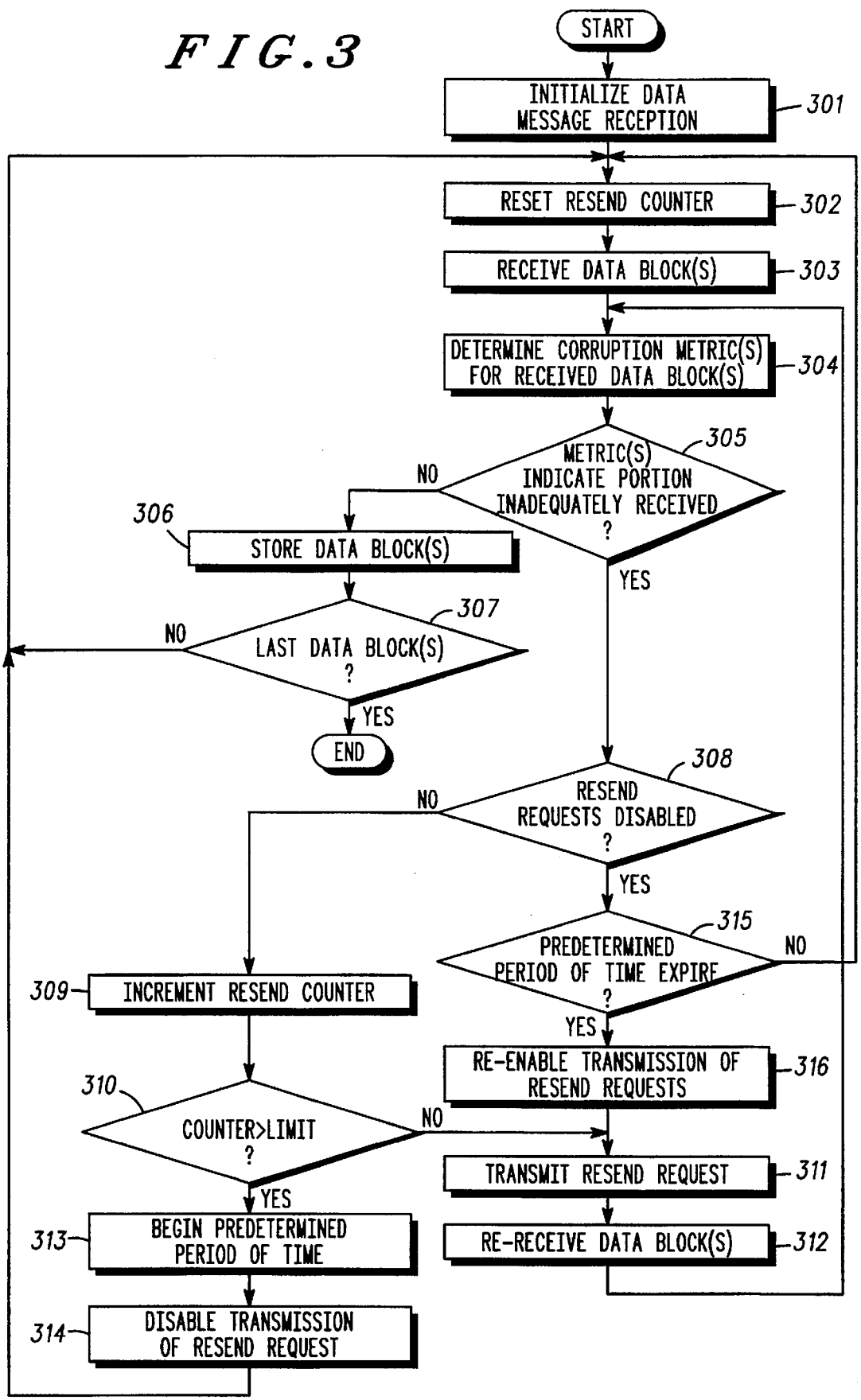
FIG. 3 illustrates a flowchart of an alternate method of communicating a data message that can be incorporated by a receiver when receiving a data message in accordance with the present invention.

FIG. 3 illustrates a flowchart of an alternate embodiment which may be used by a receiving data unit when receiving a data message in accordance with the present invention. The processing of a received data message in steps 301–312 is identical to that of steps 201–212 in FIG. 2. After determining that the resend counter exceeds the limit value (310), a predetermined period of time is initiated (313) and resend requests are disabled (314) for the duration of the predetermined period of time. The predetermined period of time could correspond to the average fading decorrelation time in a mobile RF environment. In this case, it is expected that the RF conditions will change significantly in this amount of time, such that resend requests may once again be beneficial to the receiving data unit without being detrimental to overall system efficiency. In this manner, the present invention may be tailored to suit the needs of a particular transmission medium.

Once the transmission of resend requests has been disabled (314), inadequately received data blocks will cause the process to proceed to step 315. If the predetermined period of time has expired (315), resend requests are re-enabled (316) and subsequently transmitted (311). If the predetermined period of time has not expired (315), processing continues at step 302. By adaptively disabling the transmission of resend requests as described above in FIGS. 2 and 3, the present invention provides a method of ARQ error protection that overcomes the limitations of prior art solutions.

The present invention provides a method for communicating information in a broadcast data communication system. With such a method, the inefficiencies associated with prior art ARQ schemes tailored to one-to-one communications are substantially eliminated. These inefficiencies arise because a potentially very small percentage of the receiving data units experiencing poor signal conditions can force the maximum number of resends for each transmitted data block, even though the majority of receiving data units have correctly received each data block on the first transmission attempt. In these cases, the resend requests typically do not benefit the receiving data units in question, but only serve to increase the time required to transmit the data message. The present invention allows each receiving data unit to temporarily suspend the transmission of resend requests, thus preventing an inordinate number of re-transmissions.

We claim:

1. In a broadcast communication system, a method comprising the steps of:

a) receiving a plurality of data blocks to produce received data blocks;

b) determining, for each received data block, a corruption metric to produce a plurality of corruption metrics;

c) determining, using at least one corruption metric of the plurality of corruption metrics, that a portion of received data blocks has been inadequately received;

d) when the portion of received data blocks has been inadequately received, incrementing a resend counter;

e) when the portion of received data blocks has been inadequately received and the resend counter does not exceed a counter limit value, transmitting a resend request; and f) when the portion of received data blocks has been inadequately received and the resend counter exceeds the counter limit value, disabling transmission of subsequent resend requests Corresponding to data blocks received after the step of disabling.

2. The method of claim 1, wherein step (c) further comprises the step of determining that the portion of received data blocks has been inadequately received, wherein the portion of received data blocks comprises a single received data block.

3. The method of claim 1, wherein step (d) further comprises the step of resetting the resend counter when the portion of received data blocks has been adequately received.

4. The method of claim 1, wherein step (e) further comprises the step of transmitting the resend request, wherein the resend request includes identification of the portion of received data blocks.

5. The method of claim 1, wherein step (b) further comprises the step of determining the corruption metric for each received data block, wherein the corruption metric is a function of a number of errors occurring in each received data block.

6. The method of claim 5, wherein step (c) further comprises the step of determining that the portion of received data blocks has been inadequately received when the number of errors for at least one received data block of the portion of received data blocks is greater than a predetermined threshold.

7. The method of claim 1, wherein step (b) further comprises the step of determining the corruption metric for each received data block, wherein the corruption metric is a function of a signal-to-noise measurement of each received data block.

8. The method of claim 7, wherein step (c) further comprises the step of determining that the portion of received data blocks has been inadequately received when the signal-to-noise measurement for at least one received data block of the portion of received data blocks is less than a predetermined threshold.

9. The method of claim 1, wherein step (b) further comprises the step of determining the corruption metric for each received data block, wherein the corruption metric is a function of a received signal strength measurement of each received data block.

10. The method of claim 9, wherein step (c) further comprises the step of determining that the portion of received data blocks has been inadequately received when the received signal strength measurement for at least one received data block of the portion of received data blocks is less than a predetermined threshold.

11. The method of claim 1, further comprising the steps of:

g) determining that a re-enable condition is satisfied; and h) when the re-enable condition is satisfied, re-enabling transmission of subsequent resend requests.

12. The method of claim 11, wherein step (g) further comprises the step of determining that the re-enable condition is satisfied, wherein the re-enablement condition comprises a function of at least one of a set including a number of errors occurring in each received data block, a signal-tonoise measurement of each received data block, and a received signal strength measurement of each received data block.

13. A method comprising the steps of:
   a) receiving a plurality of data blocks to produce received data blocks;
   b) determining, for each received data block, a corruption metric to produce a plurality of corruption metrics;
   c) determining, using at least one corruption metric of the plurality of corruption metrics, that a portion of received data blocks has been inadequately received; and
   d) when the portion of received data blocks has been inadequately received, disabling transmission of a resend request for a predetermined period of time.

14. The method of claim 13, wherein step (c) further comprises the step of determining that the portion of received data blocks has been inadequately received when at least one received data block of the portion of received data blocks is inadequately received.

15. The method of claim 13, wherein step (c) further comprises the step of determining that the portion of received data blocks has been inadequately received, wherein the portion of received data blocks comprises a single received data block.

16. The method of claim 13, further comprising the step of:
   e) enabling transmission of the resend request when the predetermined period of time has expired.

17. In a broadcast data communication system, a method for communicating a data message from a transmitting data unit to at least one receiving data unit, the method comprising the steps of:
   at the transmitting data unit:
   a) transmitting the data message, wherein the data message comprises a plurality of error detection coded data blocks;
   at the at least one receiving data unit:
   b) receiving, from the transmitting data unit, the data message to provide received data blocks;
   c) determining, for each received data block, a corruption metric to produce a plurality of corruption metrics;
   d) determining, using at least one corruption metric of the plurality of corruption metrics, that a portion of received data blocks has been inadequately received;
   e) when the portion of received data blocks has been inadequately received, incrementing a resend counter;
   f) when the portion of received data blocks has been inadequately received and the resend counter does not exceed a counter limit value, transmitting, to the transmitting data unit, a resend request;
   at the transmitting data unit:
   g) upon receipt of the resend request, re-transmitting at least one error detection coded data block of the plurality of error detection coded data blocks as corresponds to the portion of received data blocks to produce re-transmitted data blocks;
   at the at least one receiving data unit:
   h) receiving the re-transmitted data blocks to produce re-received data blocks;
   i) determining at least one second corruption metric based on the re-received data blocks;
   j) determining, using the at least one second corruption metric, that a portion of re-received data blocks has been inadequately received;
   k) when the portion of re-received data blocks has been inadequately received, incrementing the resend counter; and
   l) when the resend counter exceeds a counter limit value, disabling transmission of subsequent resend requests corresponding to data blocks received after the step of disabling.

18. The method of claim 17, wherein step (a) further comprises the step of transmitting the data message, wherein the data message includes the counter limit value.

19. The method of claim 17, wherein step (d) further comprises the step of determining that the portion of received data blocks has been inadequately received, wherein the portion of received data blocks comprises a single received data block.

20. The method of claim 17, wherein step (e) further comprises the step of resetting the resend counter when the portion of received data blocks has been adequately received.

21. The method of claim 17, wherein step (f) further comprises the step of transmitting the resend request, wherein the resend request includes identification of the portion of received data blocks.

22. The method of claim 17, further comprising the steps of:
   at the at least second data unit:
   m) determining that a re-enable condition is satisfied; and
   n) when the re-enable condition is satisfied, re-enabling transmission of subsequent resend requests.

* * * * *